UNITED STATES PATENT OFFICE.

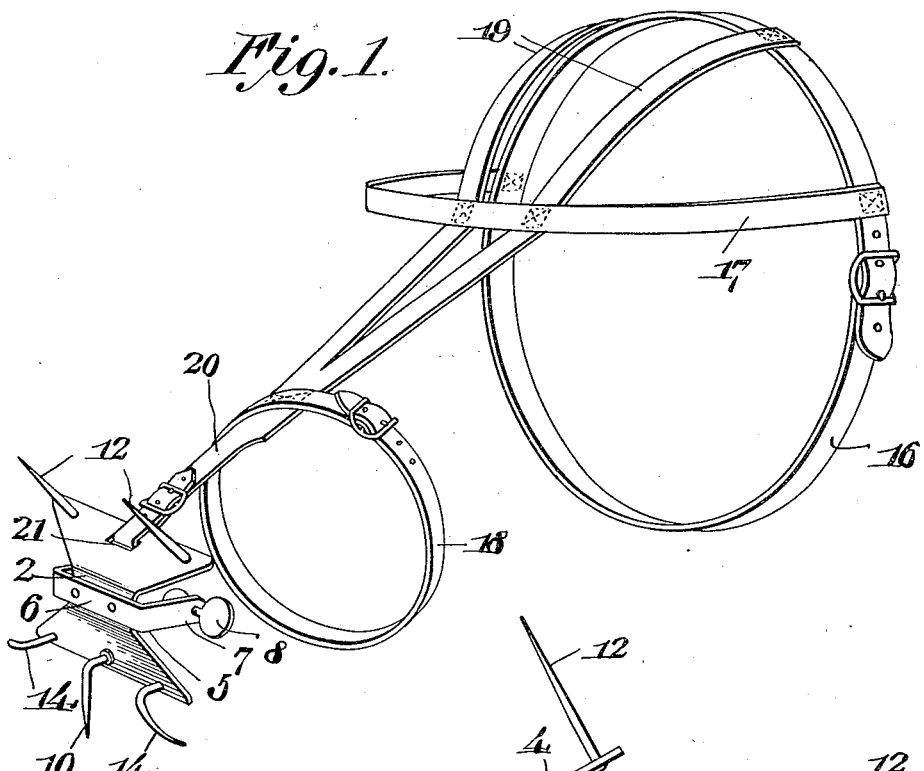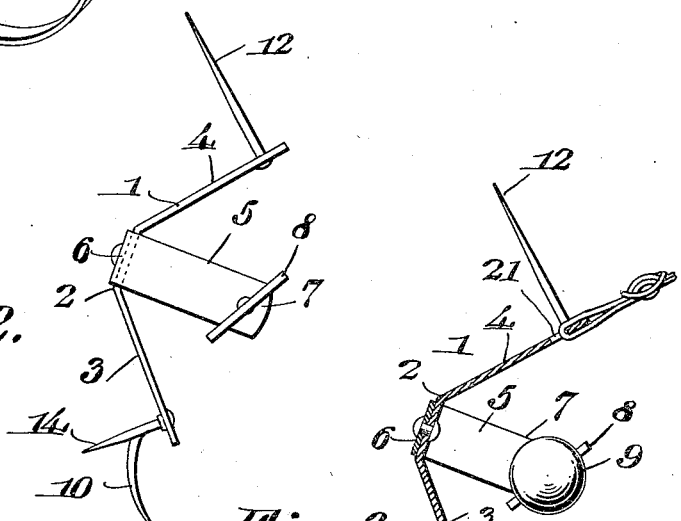

GEORGE W. BENAGE, OF JUDA, WISCONSIN.

NOSE-GUARD FOR CATTLE.

1,077,585.   Specification of Letters Patent.   Patented Nov. 4, 1913.

Application filed April 11, 1913. Serial No. 760,339.

*To all whom it may concern:*

Be it known that I, GEORGE W. BENAGE, a citizen of the United States, residing at Juda, county of Green, and State of Wisconsin, have invented certain new and useful Improvements in Nose-Guards for Cattle, of which the following is a specification.

My invention relates to weaning devices for cattle and particularly to improvements in the device illustrated and described in my Patent No. 1,051,064, issued January 21, 1913.

With the majority of cows having the practice of sucking their own teat the device described in the above mentioned patent is efficacious to stop the practice; but some cows when provided with the nose guard will toss the same upward and then grab the teat before the device drops to prevent it.

It is the object of the present invention to modify the device above mentioned so as to be efficacious with cows that have learned to toss the guard out of the way when reaching for the teat.

Further objects are to provide a device as mentioned which may be changed to meet the requirements of the particular animal; and which will be comfortable to the animal and not interfere with it grazing.

Other objects will appear hereinafter.

My invention consists generally in providing a prong on the lower portion of the device which will, if tossed out of the way by the cow in catching the teat, drop on the teat or bag and cause the animal to release the teat.

My invention consists further in various details of construction and arrangements of parts all as will be fully described hereinafter and particularly pointed out in the claims.

My invention will be more readily understood by reference to the accompanying drawings forming a part of this specification and in which—

Figure 1 is a perspective view of the device, Fig. 2 is a side elevation of the plate, and Fig. 3 is a central vertical section of the same.

Referring to the drawings, 1 indicates a plate bent transversely as at 2 to form a pair of angularly disposed portions 3 and 4, at such an angle to each other that they are adapted to conform substantially to the end and to the forward upper portion of the animal's nose. The plate is contracted in width or narrowed at the bend to permit the animal to breath freely.

Secured to the plate 1 is a clamp 5 for securing the device to the animal's nose, and comprising a transverse bar 6 fixed to the plate and having its ends turned inwardly forming a pair of ears 7—7, and a pair of screws 8—8 threaded through the ears and provided with knobs 9 on their inner ends to engage the nose between the nostrils.

Projecting at right angles from the portion 4 of the plate and near its outer end, are two prongs 12; and projecting from the portion 3 is a pair of outwardly curving side prongs 14.

The device may be provided with a straight outwardly projecting central prong on the portion 3, such as shown in my patent above mentioned, but should the cow learn to toss the plate upwardly as it reaches for the teat, I prefer to substitute a downwardly curved prong 10 the lower end of which projects but a slight distance below the lip of the animal. In practice I prefer to supply the devices to the trade with the two forms of prongs which may be used interchangeably as found necessary. If preferred the prong 10 may be swiveled to the plate as shown in Fig. 3. In either case, after the device is tossed upwardly upon reaching for the teat, the prong will drop on the teat or bag and cause the animal to let go of the teat.

16 indicates a strap to be placed about the animal's neck, 17 a strap to extend across the forehead, 18 a face strap, and 19 a pair of straps extending from the top of the strap 16 to the strap 18, and connected to the strap 17. A strap 20 extends from the face strap 18 to the plate 1, the lower end engaging in a transverse slot 21 formed in the portion 4 of the plate adjacent the upper edge. By the use of the support above described, the device may be held in position without tightening the screws to the extent necessary when the support is not employed.

Having described my invention, I claim:

1. In a device of the class described, a nose plate bent transversely to form a pair of angularly disposed portions, prongs projecting from said plate, one of said prongs being centrally arranged on the lower portion of said plate and projecting downwardly to extend below the animal's lip and means for holding said plate in position on the nose, said downwardly projecting prong being adapted to swing laterally with relation to said plate, substantially as described.

2. In a device of the class described, a nose plate bent transversely to form a pair of angularly disposed portions, prongs projecting from said plate, one of said prongs being centrally arranged on the lower portion of said plate and projecting downwardly to extend below the animal's lip, and adapted to swing laterally, and ears extending inwardly from said plate, screws threaded through said ears and provided with ends to engage the nose between the nostrils in combination with a halter and a flexible connection between said plate and said halter, substantially as described.

3. In a device of the class described, a nose plate bent transversely to form a pair of angularly disposed portions, prongs projecting from said plate, one of said prongs being centrally arranged on the lower portion of said plate and curved downwardly to extend below the animal's lip, the last mentioned prong being swiveled in said plate, and means for securing the plate in position on the animal's nose, substantially as described.

In testimony whereof I have signed my name to this specification in the presence of two subscribing witnesses.

GEORGE W. BENAGE.

Witnesses:
WM. DUNWIDDIE,
M. MESSERLE.

---

Copies of this patent may be obtained for five cents each, by addressing the "Commissioner of Patents, Washington, D. C."